United States Patent
Chung et al.

(10) Patent No.: US 9,450,857 B2
(45) Date of Patent: Sep. 20, 2016

(54) ROUTING METHOD AND APPARATUS FOR SETTING OPTIMUM MULTI-HOP HYBRID V-MIMO TRANSMISSION PATH FOR WIRELESS AD HOC NETWORK

(75) Inventors: Jong-Moon Chung, Seoul (KR); Suhwook Kim, Anyang-si (KR); Donghyuk Han, Seoul (KR); Bonghoe Kim, Anyang-si (KR); Joonhyung Kim, Seoul (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 197 days.

(21) Appl. No.: 14/111,153
(22) PCT Filed: Sep. 15, 2011
(86) PCT No.: PCT/KR2011/006807
§ 371 (c)(1),
(2), (4) Date: Oct. 10, 2013
(87) PCT Pub. No.: WO2012/141390
PCT Pub. Date: Oct. 18, 2012

(65) Prior Publication Data
US 2014/0036727 A1  Feb. 6, 2014

Related U.S. Application Data

(60) Provisional application No. 61/473,816, filed on Apr. 11, 2011.

(51) Int. Cl.
| | |
|---|---|
| H04L 12/721 | (2013.01) |
| H04W 40/20 | (2009.01) |
| H04W 40/08 | (2009.01) |
| H04W 40/12 | (2009.01) |
| H04W 40/10 | (2009.01) |
| H04B 7/02 | (2006.01) |
| H04B 7/04 | (2006.01) |

(52) U.S. Cl.
CPC .............. *H04L 45/12* (2013.01); *H04W 40/08* (2013.01); *H04W 40/20* (2013.01); *H04B 7/026* (2013.01);

(Continued)

(58) Field of Classification Search
CPC .... H04L 45/12; H04W 40/08; H04W 40/20; H04W 40/10; H04W 40/12; Y02B 60/42; Y02B 60/50; H04B 7/026; H04B 7/0413
USPC ................................. 370/238, 254, 351, 338
See application file for complete search history.

(56) References Cited

U.S. PATENT DOCUMENTS

| | | | |
|---|---|---|---|
| 6,704,283 B1 * | 3/2004 | Stiller ..................... | H04L 45/54 370/238 |
| 7,957,355 B1 * | 6/2011 | Heiferling ............. | H04W 40/12 370/338 |

(Continued)

FOREIGN PATENT DOCUMENTS

| | | |
|---|---|---|
| KR | 10-2009-0062317 A | 6/2009 |
| KR | 10-2009-0111613 A | 10/2009 |

(Continued)

*Primary Examiner* — Redentor Pasia
*Assistant Examiner* — Peter Mak
(74) *Attorney, Agent, or Firm* — Birch, Stewart, Kolasch & Birch, LLP

(57) ABSTRACT

The present invention relates to a method for setting the optimum transmission path for increasing energy efficiency in a wireless ad hoc network. More particularly, the present invention relates to setting an optimized data transmission path in a multi-hop data transmission environment in a wireless network comprising machine to machine (M2M) communication devices, which operate with limited energy, based on link information of the network, such as the position of a node in the network. And to this end, the present invention relates to a wireless M2M communication network protocol minimizing energy consumption by selecting the optimum transmission method for each of the hops from the following transmission methods: a single input single output (SISO) method; a virtual single input multiple output (V-SIMO) method; and a virtual multiple input multiple output (V-MIMO) method.

12 Claims, 11 Drawing Sheets

(52) U.S. Cl.
CPC ............ *H04B 7/0413* (2013.01); *H04W 40/10* (2013.01); *H04W 40/12* (2013.01); *Y02B 60/42* (2013.01); *Y02B 60/50* (2013.01)

(56) References Cited

U.S. PATENT DOCUMENTS

| | | | |
|---|---|---|---|
| 2002/0191573 A1* | 12/2002 | Whitehill | H04L 1/0002 370/338 |
| 2006/0007863 A1* | 1/2006 | Naghian | H04L 45/121 370/238 |
| 2008/0159259 A1* | 7/2008 | Bachir | H04L 45/00 370/351 |
| 2009/0262689 A1 | 10/2009 | Jeong et al. | |
| 2011/0019768 A1 | 1/2011 | Nammi et al. | |
| 2012/0002569 A1* | 1/2012 | Wong | H04W 40/12 370/254 |

FOREIGN PATENT DOCUMENTS

| | | |
|---|---|---|
| KR | 10-2011-0002067 A | 1/2011 |
| KR | 10-2011-0007324 A | 1/2011 |

\* cited by examiner

FIG. 2
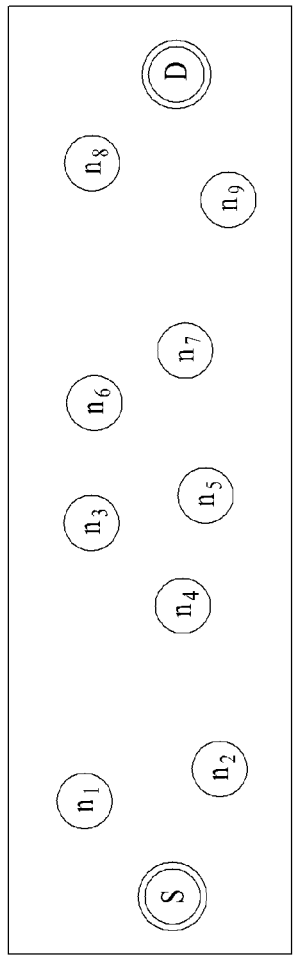
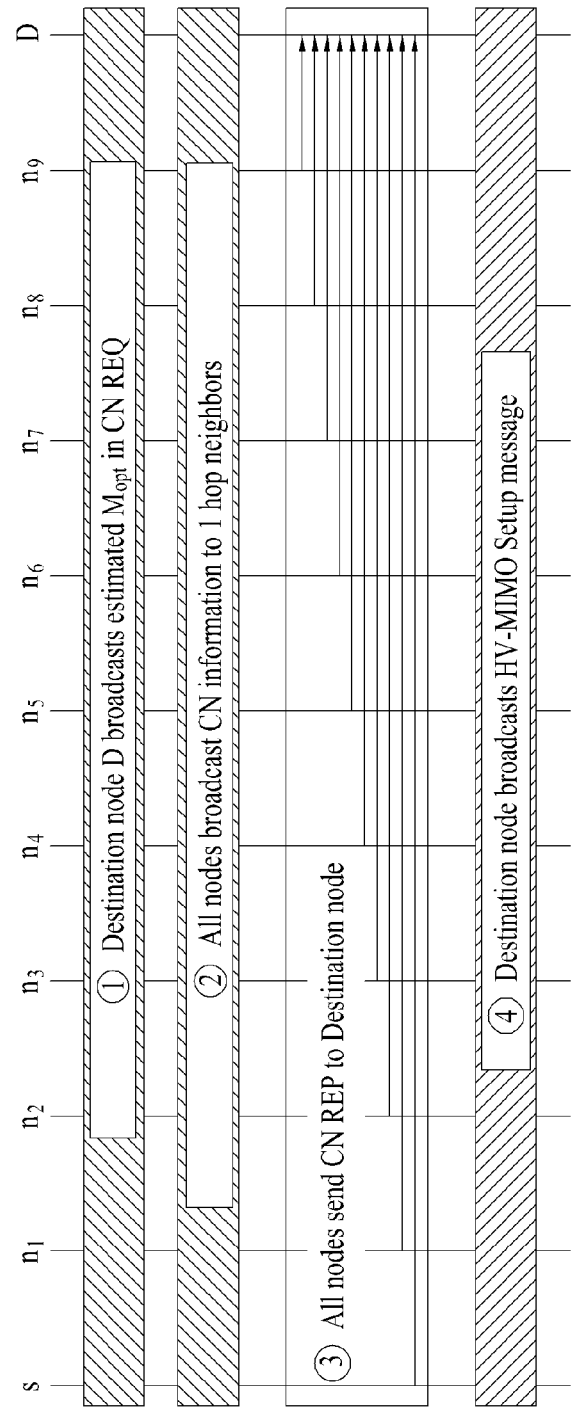

FIG. 3A

```
GET     node density  ρ
FOR     M = max(M_h^t, M_h^r) = 1 to  N
  COMPUTE   ρ_{M×M}
  COMPUTE   β(ρ_{M×M})
  COMPUTE   d̄_h
  COMPUTE   χ_{M×M}
  COMPUTE   x_{M×M} = round(χ_{M×M})
  COMPUTE   x_{M×M} E(M, M, d̄_h)
  SAVE      [M, x_{M×M} E(M, M, d̄_h)]
END LOOP
```

SET $\quad M_{opt} = \arg\min_{M}\{x_{M\times M} E(M, M, \bar{d}_h) : \forall M = 1, 2, \cdots, N\}$ DETERMINE V-MIMO Capable Node with
$\quad\quad\quad\quad M_{opt}$ Cooperation Node

DETERMINE V-MIMO MECR

```
FOR  h = 1 to  x
  IF        (M_h^t, M_h^r) = (1,1)  THEN
               Scheme(h)  is SISO ELSEIF    (M_h^t, M_h^r) = (1, r | r > 1)  THEN
            SET
```

$M_h^r = \arg\min_{M_h^r}\{E(1, M_h^r, d_h) : \forall M_h^r = 1, 2, \cdots, \min(r, M_{opt})\}$

```
               SAVE    [M_h^r, V-SIMO configuration]
               COMPUTE    {E_h(1,1,d_h) - E_h(1, M_h^r, d_h)}
                       IF less than 0 THEN
                              Scheme(h)  is SISO
                       ELSE
                              Scheme(h)  is V-SIMO
                       ENDIF ELSEIF    (M_h^t, M_h^r) = (t, 1 | t > 1)  THEN
            SET
```

$M_h^t = \arg\min_{M_h^t}\{E(M_h^t, 1, d_h) : \forall M_h^t = 1, 2, \cdots, \min(t, M_{opt})\}$

```
               SAVE    [M_h^t, V-MISO configuration]
```

FIG. 3B $$\text{COMPUTE} \quad \{E_h(1,1,d_h) - E_h(M_h^t, 1, d_h)\}$$
IF less than 0 THEN
$Scheme(h)$ is SISO
ELSE
$Scheme(h)$ is V-MISO
ENDIF ELSEIF $\quad (M_h^t, M_h^r) = (t, r \mid t, r > 1)$ THEN
SET
$$M_h^r = \arg\min_{M_h^r}\{E(1, M_h^r, d_h) : \forall M_h^r = 1, 2, \cdots, \min(r, M_{opt})\}$$

SAVE $\quad [M_h^r, \text{V-SIMO configuration}]$
COMPUTE $\quad \{E_h(1,1,d_h) - E_h(1, M_h^r, d_h)\}$
IF less than 0 THEN
$Scheme(h)$ is SISO
ENDIF
SET
$$M_h^* = \arg\min_{M_h^*}\{E(M_h^*, M_h^*, d_h) : \forall M_h^* = 1, 2, \cdots, \min(t, r, M_{opt})\}$$

SAVE $\quad [M_h^*, \text{V-MIMO configuration}]$
COMPUTE $\quad \{E_h(1, M_h^r, d_h) - E_h(M_h^*, M_h^*, d_h)\}$
IF larger than 0 THEN
$Scheme(h)$ is V-MIMO
ENDIF
SET
$$M_h^t = \arg\min_{M_h^t}\{E(M_h^t, 1, d_h) : \forall M_h^t = 1, 2, \cdots, \min(t, M_{opt})\}$$

SAVE $\quad [M_h^t, \text{V-MISO configuration}]$
COMPUTE $\quad \{E_h(1, M_h^r, d_h) - E_h(M_h^t, 1, d_h)\}$
IF larger than 0 THEN
$Scheme(h)$ is V-MISO
ELSE
$Scheme(h)$ is V-SIMO
ENDIF
ENDIF

ENDLOOP

CN REQ Massage Format

| 0 |  |  |  |  |  |  |  | 1 |  |  |  |  |  |  |  | 2 |  |  |  |  |  |  |  | 3 |
|---|---|---|---|---|---|---|---|---|---|---|---|---|---|---|---|---|---|---|---|---|---|---|---|---|
| 0 1 2 3 4 5 6 7 | 8 9 0 1 2 3 4 5 6 7 8 9 0 1 |

| Type | J | R | G | D | U | M | Reserved | Hop Count |
|---|---|---|---|---|---|---|---|---|
| CN REQ ID ||||||||||
| Destination IP Address ||||||||||
| Destination Sequence Number ||||||||||
| Originator IP Address ||||||||||
| Originator Sequence Number ||||||||||

FIG. 6

CN Information Massage Format

| Type | | R | A | M | Reserved | Prefix Size | Hop Count |
|---|---|---|---|---|---|---|---|
| Destination IP Address ||||||||
| Destination Sequence Number ||||||||
| Originator IP Address ||||||||
| LifeTime |||||||| bit positions: 0 1 2 3 4 5 6 7 8 9 0 1 2 3 4 5 6 7 8 9 0 1 2 3 4 5 6 7 8 9 0 1

FIG. 7

CN REP Massage Format

| Type | R | A | M | W | E | Reserved | Prefix Size | Hop Count |
|---|---|---|---|---|---|---|---|---|
| Destination IP Address |||||||||
| Destination Sequence Number |||||||||
| Originator IP Address |||||||||
| LifeTime |||||||||
| Location Infotmation |||||||||
| CN IP Address ||||||||| bit positions: 0 1 2 3 4 5 6 7 8 9 0 1 2 3 4 5 6 7 8 9 0 1 2 3 4 5 6 7 8 9 0 1

FIG. 8

HV-MIMO Setup Massage Format

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |

| Type | R | A | M | C | Reserved | Prefix Size | Hop Count |
|---|---|---|---|---|---|---|---|
| Destination IP Address ||||||||
| Destination Sequence Number ||||||||
| Originator IP Address ||||||||
| LifeTime ||||||||
| HV-MIMO Transmission IP Address ||||||||

FIG. 9

HV-MIMO Header

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |

| V | HV-MIMO Type | Feedback | Reserved | Seqeunce Number |
|---|---|---|---|---|

(a)

Hybrid V-MIMO Device Block Diagram (b)

ROUTING METHOD AND APPARATUS FOR SETTING OPTIMUM MULTI-HOP HYBRID V-MIMO TRANSMISSION PATH FOR WIRELESS AD HOC NETWORK

CROSS REFERENCE TO RELATED APPLICATIONS

This application is the National Phase of PCT/KR2011/006807 filed on Sep. 15, 2011, which claims priority under 35 U.S.C. 119(e) to U.S. Provisional Application No. 61/473,816 filed on Apr. 11, 2011, all of which are hereby expressly incorporated by reference into the present application.

TECHNICAL FIELD

The present invention relates to a routing method and apparatus for configuring an optimal multi-hop hybrid V-MIMO transmission path in a wireless ad hoc network.

BACKGROUND ART

A wireless ad hoc network refers to a network with no base structure, that is autonomously configured by nodes thereof. That is, the wireless ad hoc network is a network that does not require a base network device such as a base station or an access point, for network configuration and maintenance.

It is important to configure a routing path consuming minimum power in a wireless ad hoc network.

An optimal transmission path configuration method for raising energy efficiency in the wireless ad hoc network includes transmission techniques of multiple input multiple output (MIMO) and virtual MIMO (V-MIMO). Among these, a variety of MIMO transmission techniques has been developed due to high bandwidth efficiency of a MIMO transmission scheme. However, since circuit construction of a transmitter and a receiver for MIMO transmission becomes complicated and energy consumed in a circuit of the transmitter and the receiver increases, the MIMO transmission techniques have a difficulty in being used in the wireless ad hoc network. Further, installation of a plurality of antennas to a small sensor is also an obstacle to implementation of MIMO transmission techniques. Due to such problems, a V-MIMO transmission technique using a virtual antenna array has been proposed as a solution for applying MIMO techniques to an ad hoc network. While the wireless ad hoc network to which V-MIMO is applied has an advantage of multiplexing gain, energy is additionally consumed and transmission delay occurs, for cooperation between sensors participating in transmission. Accordingly, in the case where a data transmission distance is short, the V-MIMO transmission technique is inefficient in terms of energy and delay time.

Meanwhile, all of ad-hoc on-demand distance vector (AODV), dynamic source routing (DSR), and dynamic MANET on-demand (DYMO) are on-demand routing algorithms for the wireless ad hoc network. AODV is based on destination-sequenced distance-vector routing (DSDV) which is a table-driven algorithm based on a Bellman-Ford algorithm. If there are no valid paths when a source node starts transmission to a destination node, this routing protocol operates to form a path in such a manner that the source node searches for a path from neighboring nodes and middle nodes by broadcasting a route request (RREQ) message and nodes capable of forming the path transmit a route reply (RREP) message to the source node.

DSR maintains a routing path by maintaining and updating a path cache known to a mobile node. If there is a valid path up to a destination node when a source node starts transmission, this routing protocol operates to form a path in such a manner that the source node stores the path cache and transmits packets. If there are no paths, the source node performs path search by broadcasting an RREQ packet. Upon encountering a node including a valid path cache, the destination node transmits an RREP packet.

DYMO is a wireless ad hoc on-demand protocol for forming a path through an RREQ message and an RREP message, similarly to AODV and DSR. DYMO is a routing protocol developed after AODV and more easily implemented than AODV while maintaining advantages of AODV.

In the above protocols, only one equal transmission scheme is used among single input single output (SISO), virtual SISO (V-SISO), virtual multiple input single output (V-MISO), and V-MIMO. Accordingly, energy efficiency is reduced in every transmission distance of one hop.

DISCLOSURE

Technical Problem

An object of the present invention devised to solve the problem is to provide a method and apparatus for configuring an optimal transmission path in terms of energy efficiency in a wireless ad hoc network of a multi-hop transmission environment with restricted energy.

Another object of the present invention is to provide to a hybrid V-MIMO transmission technology for selecting an optimal combination using various transmission techniques such as SISO, V-MISO, V-SIMO, and V-MIMO in each interval of an optimal path.

Technical Solution

According to an aspect of the present invention, a method for configuring a data transmission path from a first node to a second node at a predetermined node in an ad hoc network includes calculating a number of optimal cooperative nodes, $M_{opt}$, in the network; transmitting a cooperative node request message including the number of the optimal cooperative nodes, $M_{opt}$, to all nodes in the network; receiving a cooperative node reply message from one or more nodes in the network; configuring an optimal transmission path from the first node to the second node and cooperative transmission nodes and/or cooperative reception nodes in each hop of the optimal transmission path, based on the cooperative node reply message; and transmitting a cooperative node setup message indicating information on the cooperative transmission nodes and/or the cooperative reception nodes for optimal transmission path configuration to associated nodes.

According to another aspect of the present invention, an apparatus for configuring a data transmission path from a first node to a second node at a predetermined node in an ad hoc network includes a radio communication module configured to transmit and receive signals and a processor module, wherein the processor module calculates a number of optimal cooperative nodes, $M_{opt}$, in the network, controls the radio communication module to transmit a cooperative node request message including the number of the optimal cooperative nodes, $M_{opt}$, to all nodes in the network, configures an optimal transmission path from the first node to the second node and cooperative transmission nodes and cooperative reception nodes in each hop of the optimal transmission path, based on a cooperative node reply message received from one or more nodes in the network, and controls the radio communication module to transmit a cooperative node setup message indicating information on the configured cooperative transmission nodes and cooperative reception nodes to associated nodes.

According to each aspect of the present invention, the number of the optimal cooperative nodes, $M_{opt}$, may be calculated by the first node, or the second node, or a middle node having higher power in the network.

According to each aspect of the present invention, wherein each of the number of the cooperative transmission nodes and the number of the cooperative reception nodes configured in each hop may be less than the number of the optimal cooperative nodes, $M_{opt}$.

According to each aspect of the present invention, calculating the number of the optimal cooperative nodes, $M_{opt}$, may determines the number of the optimal cooperative nodes based on distance between each node in the network and energy of each node.

Advantageous Effects

According to the present invention, energy efficiency and connectivity of data transmission can be raised by combining transmission schemes optimized for energy in each interval of one or multiple intervals obtained by dividing a data transmission path in a large-scale ad hoc network. A conventional V-MIMO protocol is inefficient compared with SISO in terms of energy and delay time in the case of a short data transmission distance. The present invention has an effect of satisfying service quality by minimizing energy consumption because a data transmission path is divided into intervals of optimal length satisfying service quality and because an optimal data transmission scheme satisfying service quality is selectively used in each interval.

DESCRIPTION OF DRAWINGS

FIG. 2 is a view illustrating the structure of a message flow for optimal V-MIMO transmission based on a destination node according to an embodiment of the present invention.

FIG. 3 illustrates energy consumption optimal path configuration algorithm of protocol for configuring an optimal V-MIMO transmission path in an ad hoc network of a multi-hop transmission environment.

FIG. 6 is a view illustrating a CN information message format for use in information exchange for optimal V-MIMO transmission.

FIG. 7 is a view illustrating a CN reply (REP) message format proposed for use in information exchange for optimal V-MIMO transmission.

FIG. 8 is a view illustrating an HV-MIMO setup message format for use in information exchange for optimal V-MIMO transmission.

FIG. 9 illustrates a protocol header format for use in information exchange for optimal V-MIMO transmission.

BEST MODE

Figure 1:
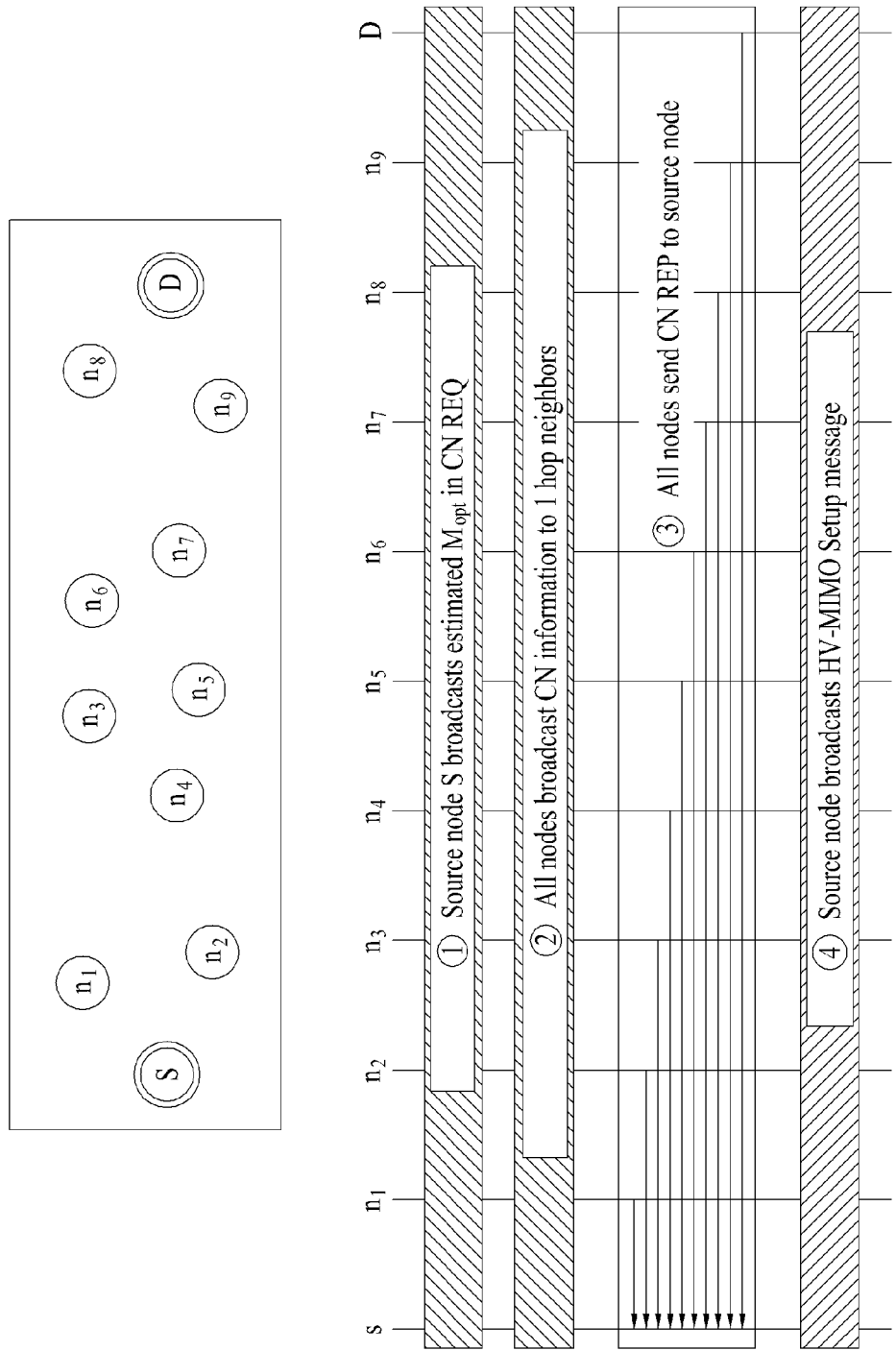
FIG. 1 is a view illustrating the structure of a message flow for optimal V-MIMO transmission based on a source node according to an embodiment of the present invention.
Figure 15:
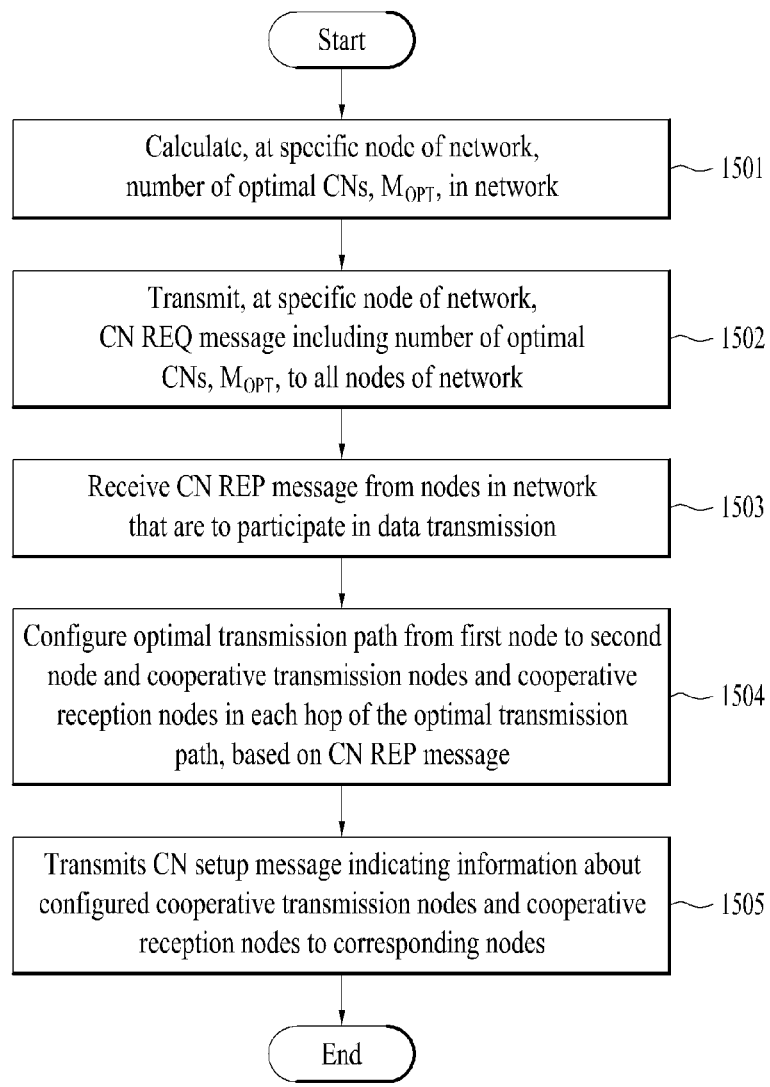
FIG. 15 is a flowchart illustrating optimal V-MIMO transmission based on a middle node of a network according to another embodiment of the present invention.

A protocol proposed in the present invention may operate based on a source node or a destination node. However, the present invention is not restricted to the source node or destination node based protocol operation, a middle node based protocol is applicable thereto. FIGS. 1 and 2 illustrate message flows of the source node based protocol operation and the destination node based protocol operation, respectively. A message flow of the middle node based protocol operation is illustrated in FIG. 15, which will be described later.

In the present invention, a first node may be any one of a destination node, a source node, and a middle node having high power in a network. The destination node, source node, and middle node, which will be described later, may be substituted with one another in operation. Hence, description of the destination node may be interpreted based on the source node or the middle node.

In the present invention, a node refers to a communication device (a communication terminal or relay) for transmitting and receiving data and a hop refers to an absolute path between data communication equipment positioned in each node. Alternatively, the node may refer to a system such as a router. A connection between nodes is referred to as a segment. Passing between segments is referred to as a hop. Each segment has an independent network address. Accordingly, the term 'between nodes' may be used interchangeably with term 'between hops'.

FIG. 1 illustrates a message flow when V-MIMO transmission is configured based on a source node. Hereinafter, the number of optimal cooperative nodes, $M_{opt}$, refers to an optimal value of the number of virtual reception nodes, $M_r$, and the number of virtual transmission nodes, $M_t$, in each node of a network. Calculation of the number of optimal cooperative nodes, $M_{opt}$, will be described later.

First, the source node calculates the number of optimal cooperative nodes, $M_{opt}$, and transmits a cooperative node (CN) request (REQ) message including the calculated $M_{opt}$ to all nodes in a network through (□). For example, the source node S transmits the CN REQ message to nodes n1 to n9 in the network.

The nodes, which have received the message from the source node, transmit a CN information message to neighboring nodes within a distance of one hop therefrom, for cooperation with a maximum of $M_{opt}$ nodes (□). Referring to FIG. 1, the nodes n1 to n9, which have received the CN REQ message, transmit the CN information message to nodes within a distance of one hop.

Upon receiving the CN information message, the nodes store node information, which is a list of up to $M_{opt}$ CNs among neighboring nodes within a distance of one hop in order of the strongest received signal strength (RSS) of CN information, and unicast a CN reply (REP) message, including location information of the nodes and the node information, to the source node. The CNs refer to cooperative transmission nodes and/or cooperative reception nodes for data transmission (□). Referring to FIG. 1, the nodes n1 to n9 transmit the CN REP message to the source node. The nodes transmitting the CN REP message may be nodes which can participate in data transmission among the nodes receiving the CN information message.

The source node transmits a CN setup message, which is information indicating cooperative transmission nodes and cooperative reception nodes for configuring an optimal transmission path in each hop, to associated nodes, based on the CN REP message. Accordingly, upon receiving the CN REP message from the nodes in the network in FIG. 1, the source node generates the CN setup message, which is optimal transmission path configuration information. The source node transmits the CN setup message for hybrid V-MIMO (HV-MIMO) transmission to nodes n1 to n9 (□). As described above, the source node configures an optimal transmission path in each hop and transmits data for a protocol operation. Therefore, each node in the network may acquire knowledge as to from which nodes in the network information is received and to which nodes information is transmitted. Each node of the network may store information about nodes from which data is received and nodes to which data is transmitted and may change the information at a prescribed period.

The above process may be performed based on the destination node rather than the source node. A destination node based routing path configuration is as illustrated in FIG. 2 and is performed by the destination node instead of the source node in an almost same manner as the source node based path configuration shown in FIG. 1. That is, as shown in FIG. 2, the destination node broadcasts a CN REQ message including information about the number of optimal CN numbers, $M_{opt}$, to nodes in the network through (□). For example, the destination node D transmits the CN REQ message to nodes n1 to n9 in the network.

The nodes, which have received the message from the destination node, transmit a CN information message to neighboring nodes within a distance of one hop, for cooperation with a maximum of $M_{opt}$ nodes (□). That is, as illustrated in FIG. 2, the nodes n1 to n9, which have received the CN REQ message, transmit the CN information message to nodes within a distance of one hop.

Upon receiving the CN information message, the nodes store node information, which is a list of up to $M_{opt}$ CNs among neighboring nodes within a distance of one hop in order of the strongest RSS of CN information, and unicast a CN REP message including location information of the nodes and the CN information to the destination node. The CNs refer to cooperative transmission nodes and/or cooperative reception nodes for data transmission (□). As illustrated in FIG. 2, the nodes n1 to n9 transmit the CN REP message to the destination node.

Through such a process, each node in the network configures a maximum of $M_{opt}$ CNs which can cooperate therewith and receives information of the CNs. The destination node transmits a CN setup message, which is information indicating cooperative transmission nodes and/or cooperative reception nodes for optimal transmission path configuration in each hop, to associated nodes based on the CN REP message. Accordingly, upon receiving the CN REP message from the nodes in the network in FIG. 2, the destination node generates a CN setup message, which is optimal transmission path configuration information. The destination node transmits the CN setup message for HV-MIMO transmission to the nodes n1 to n9 (□).

As described previously, the V-MIMO transmission path configuration method for a transmission process in a protocol is not limited to the source node or destination node based operation and may be applied to operation based on a specific node in the network. In this case, the specific node in the network receives power from, for example, the exterior to perform smooth operation of calculating the number of optimal CNs, $M_{opt}$, and transmitting and receiving messages.

FIG. 3 illustrates a pseudo code for implementing the operation of the aforementioned protocol. The following is description of each part of the pseudo code. For convenience of description, although the pseudo code of FIG. 3 when the source node is described as calculating/transmitting $M_{opt}$, $M_{opt}$ may be calculated/transmitted by an arbitrary node in the network as described earlier.

(1) Get Node Density ρ

An optimal transmission scheme proposed in the present invention depends on whether density of nodes in a network is high or low. Accordingly, the source node reads a density value ρ obtained in a network initial establishment step. In this case, the network density ρ may be determined according to one among the following methods.

① Direct Input by Network Designer/Controller

In this method, a network designer/controller directly inputs a node density value as an initial value after network installation.

② Estimation from Number of Neighboring Nodes

This method estimates the network density based on the number of nodes responding to a broadcast message. The source node may estimate the number of nodes per unit area, i.e. ρ, from the number of nodes within broadcast range.

③ Use of Global Positioning System (GPS) Information

If GPS information is available, a density value of actual nodes may be measured and calculated through position information of a GPS.

(2) For M=max($M_h^t$, $M_h^r$)=1 to N

The pseudo code, which is an example of a protocol proposed in the present invention, includes a step of obtaining an optimal value of the number of virtual input and output nodes of V-MIMO, V-MISO, and V-SIMO transmission schemes according to network environment. Then, in the network, nodes corresponding in number to optimal virtual input and output nodes in various input and output combinations of 2×2, 3×3, etc. during data transmission participate in transmission. An optimal combination of input and output nodes may be obtained by the following process.

Prior to data transmission, the source node calculates optimal transmission energy with respect to each case where a parameter M=max($M_h^t$, $M_h^r$) is 1 to N representative of each input and output combination ($M_h^t$, $M_h^r$) by using node density ρ. $M_h^t$ denotes the number of transmission output nodes and $M_h^r$ denotes the number of reception input nodes. That is, the source node may calculate the optimal transmission energy in each node in consideration of the transmission output nodes and reception input nodes.

The case having a minimum value out of optimal transmission energy with respect to M=1, 2, 3, ... N is defined as $M_{opt}$ which means the number of optimal virtual input and output nodes during V-MIMO, V-MISO, or V-SIMO data transmission. The above process is described in detail in each step of the following (3) to (10). An arbitrary parameter N designates a proper number as a maximum value of the number of CNs used for an optimal V-MIMO transmission scheme. Although an optimal value of the number of CNs may differ according to network environment, generally, the value is preferably 5 or less in consideration of complexity of implementation. The parameter N may be input by a designer during network configuration. According to network environment, a number from 2 to 5 is input so that the source node may obtain the number of optimal input/output nodes, $M_{opt}$, from virtual input/output combinations of 2×2, 3×3, and 4×4. As N decreases, time consumed for initial transmission establishment is reduced. However, there may be a disadvantage that an optimal transmission scheme cannot be selected in a given network.

(3) Compute $\rho_{M \times M}$

An effective node density $\rho_{M \times M}$ is calculated with respect to each case of M=1, 2, ... N. $\rho_{M \times M}$ refers to an estimation value indicating the density of nodes including CNs necessary for V-MIMO, V-MISO, or V-SIMO transmission in a given network environment and can be calculated by the following Equation 1 according to Poisson approximation of a random point.

$$\rho_{M \times M} = \frac{\rho e^{-\pi (d_{local})^2 \rho} \{\pi (d_{local})^2 \rho\}^M}{M!} \quad \text{[Equation 1]}$$

where $d_{local}$ denotes a maximum value of the distance between nodes forming virtual input or virtual output. A designer/controller may input the value according to a network channel environment. As the value $d_{local}$ increases, there is an advantage that probability of obtaining gain through virtual input/output transmission increases even in a network having low node density and there is a disadvantage that energy consumption used for information exchange between virtual input and output nodes increases.

(4) Compute $\beta(\rho_{M \times M})$ $\beta(\rho_{M \times M})$ is calculated with respect to each case in which M equals 1, 2, ... N. The sum of transmission distances according to a transmission path between the source node and the destination node is necessarily longer than an ideal minimum distance. In this case, $\beta(\rho_{M \times M})$ is a parameter indicating how much an actual transmission distance is greater than the ideal minimum distance.

Figures 4, 5:
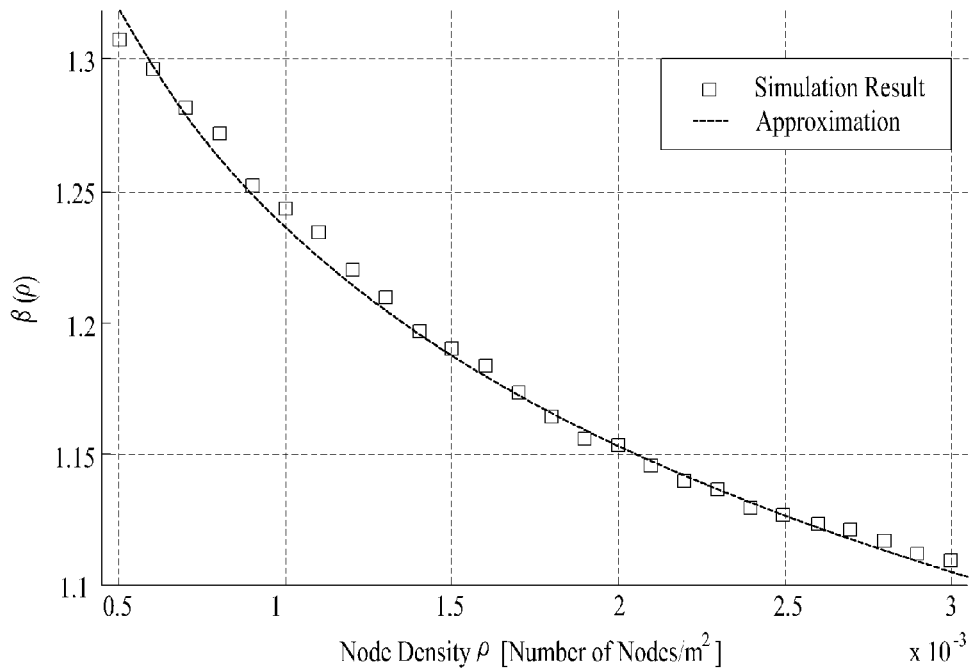
FIG. 4 is a graph illustrating an average distance between nodes during routing formation according to node density.
FIG. 5 is a view illustrating a cooperative node (CN) request (REQ) message format proposed for use in information exchange for optimal virtual multiple input multiple output (V-MIMO) transmission.

$\beta(\rho_{M \times M})$ is a parameter used to calculate an average distance between nodes during routing formation and may be obtained by a statistical value according to node density. FIG. 4 is a graph illustrating a simulation result of calculating an approximation value of a statistically obtained $\beta(\rho_{M \times M})$. When node density is $0.0005 \leq \rho \leq 0.0030$, $\beta(\rho)$ may be indicated by the following equation 2.

$$\beta(\rho) = -0.119 \ln(\rho) + 0.414 \quad \text{[Equation 2]}$$

(5) Compute $\chi_{M \times M}$

An ideal transmission hop count $\chi_{M \times M}$ is calculated with respect to each case in which M equals 1, 2, ... N. $\chi_{M \times M}$ is a value obtained by mathematically calculating a hop count having minimum transmission energy according to network environment. Since the value may not be a natural number, $\chi_{M \times M}$ may be rounded to a natural number when the value is applied to an actual transmission hop count. This is performed in the next step (6).

The ideal transmission hop count $\chi_{M \times M}$ may be calculated through the following step.

$$\chi_{M \times M} E_h(M, M, \bar{d}_h) = \chi_{M \times M} \quad \text{[Equation 3]}$$

$$\left[ MN_i \left\{ \frac{(4\pi)^2 (2^{k_h} - 1) \xi_h MN_0 M_L N_f}{1.6 \|H_{M \times M}\|_F^2 \eta G_t G_r \lambda^2} \ln\left(\frac{0.2}{P_b}\right) \left(\beta \frac{d_{SD}}{\chi_{M \times M}}\right)^\kappa + \frac{P_h^c}{k_h B} \right\} + \sum_{i=1, M \geq 2}^{M} (N_i E_i^t + E_j^r n_r N_s) \right]$$

The above Equation 3 indicates total energy used for data transmission from the source node to the destination node and is comprised of the product of the transmission hop count $\chi_{M \times M}$ and transmission energy $E_h(M, M, \bar{d}_h)$ of each hop.

$P_h^c$ is a parameter having a constant value related to physical properties of an ad hoc node and may be indicated by the following Equation 4.

$$P_h^c \approx M_h^t (P_{DAC} + P_{mix} + P_{filt}) + 2P_{syn} + M_h^r (P_{LNA} + P_{mix} + P_{IFA} + P_{filr} + P_{ADC}) \quad \text{[Equation 4]}$$

In the above Equation 4, an average $\bar{d}_h$ of the distance between nodes in each hop may be obtained by $$\beta \frac{d_{SD}}{\chi_{M \times M}}.$$

In this case, $d_{SD}$ is the distance between the source node and the destination node and may be obtained by the following two methods.

When GPS information is available, a relatively precise node distance can be calculated by reading location information of a node. When there is no GPS information, node distance may be estimated from RSS. Reception power $P_r$ in a free space may be indicated by the following Equation (5).

$$P_r = C_t \frac{P_t}{d^2} \quad \text{[Equation 5]}$$

In this case, $P_t$ is transmission power, d is the distance between a receiver and a transmitter, and $C_t$ is a constant according to characteristics of the transmitter and receiver. From the above equation, a transmission distance using magnitude of reception power can be estimated. A more accurate distance estimation method using RSS in a WSN has been announced in many international journals, as a new research result.

When differentiating the above Equation 5 in order to obtain an optimal transmission hop count $\chi_{M \times M}$, the following result of Equation 6 is acquired.

$$\frac{\partial \{\chi_{M \times M} E_h(M, M, \bar{d}_h)\}}{\partial \chi_{M \times M}} = \quad \text{[Equation 6]}$$

$$N_i \left\{ \frac{(1-\kappa)(4\pi)^2 (2^{k_h} - 1) \xi_h (M)^2 N_0 M_L N_f \beta^\kappa d_{SD}^\kappa}{1.6 \|H_{M \times M}\|_F^2 \eta G_t G_r \lambda^2 (\chi_{M \times M})^\kappa} \ln\left(\frac{0.2}{P_b}\right) + \right.$$

-continued $$\frac{MP_h^c}{k_h B} + \sum_{i=1, M \geq 2} \left( E_i^t + E_j^r n_r \frac{N_s}{N_i} \right) \right\} = 0$$

The optimal hop count $\chi_{M \times M}$ acquired by the above differential result is as indicated by Equation 7.

$$\chi_{M \times M} = \beta d_{SD} \qquad \text{[Equation 7]}$$

$$\sqrt[\kappa]{\frac{(\kappa - 1)(4\pi)^2 (2^{k_h} - 1) \xi_h(M)^2 N_0 M_L N_f \ln\left(\frac{0.2}{P_b}\right)}{1.6 \|H_{M \times M}\|_F^2 \eta G_t G_r \lambda^2 \left( \frac{MP_h^c}{k_h B} + \sum_{i=1, M \geq 2}^{M} \left( E_i^t + E_j^r n_r \frac{N_s}{N_i} \right) \right)}}$$

(6) Compute $x_{M \times M}$=round ($\chi_{M \times M}$)

$\chi_{M \times M}$ calculated in step (5) is a theoretical value. Since an actual transmission hop count should be a natural number, the actual hop count $x_{M \times M}$ can be obtained using a rounding function, round ($\chi_{M \times M}$).

(7) Compute $x_{M \times M} E(M, M, \bar{d}_h)$

An optimal value of energy used for data transmission from the source node to the destination node is calculated with respect to each case in which M is 1, 2, ... N. Transmission energy is comprised of the product of the optimal hop count $x_{M \times M}$ and transmission energy $E_h(M, M, \bar{d}_h)$ of each hop.

(8) Save $[M, x_{M \times M} E(M, M, \bar{d}_h)]$

The calculated optimal transmission energy value is saved with respect to each case in which M is 1, 2, ... N. The saved value is used to obtain M having the least energy by comparing optimal transmission energy values for each M in step (9). Therefore, in FIG. 3, the saving step of $[M, x_{M \times M} E(M, M, \bar{d}_h)]$ is to save values calculated by the source node through steps (2) to (7) in order to obtain the number of V-MIMO CNs, M, for minimizing transmission energy in a given network environment.

(9) SET $M_{opt} = M_{opt} = \underset{M}{\operatorname{argmin}} \{x_{M \times M} E(M, M, \bar{d}_h): \forall M = 1, 2, \ldots, N\}$ The source node acquires the number of optimal V-MIMO CNs, $M_{opt}$, in a given network by comparing energy consumption values for the number of V-MIMO CNs saved in step (8). This may be expressed as the following Equation 8.

$$M_{opt} = \underset{M}{\operatorname{argmin}} \{x_{M \times M} E(M, M, \bar{d}_h): \forall M = 1, 2, \ldots, N\} \qquad \text{[Equation 8]}$$

(10) Determine V-MIMO MECR

According to the pseudo code, the source node broadcasts a CN REQ message to all nodes in a network. The CN REQ message includes the value $M_{opt}$ calculated in the above step (9) and all nodes in the network may receive the number of optimal CNs in a current network situation. Upon receiving the CN REQ message, all nodes transmit a CN information message including IP addresses or IDs the nodes to neighboring nodes separated by one hope. All nodes receiving the CN information message or nodes that can participate in data transmission store information about $M_{opt}$ nodes having the strongest RSS of the CN information message and transmit a CN REP message including location information of the nodes and the information about $M_{opt}$ CNs to the source node. The source node determines nodes for minimum energy consumption routing (MECR) setup up to the destination node through calculation of the following steps (11) to (20) using the received information and determines roles of the nodes. In this case, in an interval during which density of nodes is low or the number of CNs does not reach the optimal value $M_{opt}$ due to low batteries of neighboring nodes and the like, calculation of steps (11) to (20) is performed through possible V-MIMO configuration of nodes less than $M_{opt}$.

(11) For h=1 to x

According to the protocol proposed in the present invention, an optimal transmission scheme is selected with respect to each hop of 1 to x. A method for minimizing energy consumption among transmission schemes of V-MIMO, V-MISO, V-SIMO, and SISO is selected as the optimal transmission scheme in consideration of the number of possible CNs in each hop.

In energy consumption efficiency of each transmission scheme according to a transmission distance, SISO has high energy efficient in a short transmission distance, V-MIMO has high energy efficient in a long transmission distance, and V-MISO and V-SIMO have high energy efficiency in a medium transmission distance. Accordingly, A method for selecting a transmission scheme having optimal energy in each hop may be obtained according to steps (12) to (20).

(12) If $(M_h^t, M_h^r) = (1, 1)$ then Scheme (h) is SISO

When $(M_h^t, M_h^r) = (1,1)$, a transmission scheme Scheme (h) is SISO. If the number of nodes which can be used for transmission is one in each of a transmitter and a receiver, that is, if only nodes on an MECR of a corresponding hop can perform communication, node-to-node communication determined in step (10) is performed and, therefore, the transmission method conforms to a SISO scheme.

(13) Elseif $(M_h^t, M_h^r) = (1, r | r > 1)$ Then

In the case where $(M_h^t, M_h^r) = (1, r | r > 1)$, since the numbers of nodes which can be used for transmission in the transmitter and the receiver are one and plural, respectively, SISO transmission and V-SIMO transmission may be considered. Then, to estimate a method having better energy efficiency, among SISO transmission and V-SIMO transmission, an optimal CN is configured by comparing energy consumption values of V-SIMO transmission with respect to the number of optimal CNs, $M_h^r$, used for V-SIMO transmission, starting from 1 to min(r, $M_{opt}$). That is, $$M_h^r = \underset{M_h^r}{\operatorname{argmin}} \{E(1, M_h^r, d_h): \forall M_h^r = 1, 2, \ldots, \min(r, M_{opt})\}$$

is configured and the configured $M_h^r$ is stored.

(14) Compute $\{E_h(1, 1, d_h) - E_h(1, M_h^r, d_h)\}$

To estimate a transmission method having higher energy efficiency, among SISO and V-SIMO, $\{E_h(1,1,d_h) - E_h(1, M_h^r, d_h)\}$ is calculated by the following Equation 10.

$$\{E_h(1, 1, d_h) - E_h(1, M_h^r, d_h)\} = \qquad \text{[Equation 10]}$$

$$\Psi_h N_i d_h^\kappa \left\{ \frac{1}{\|H_{[\times]}\|_F^2} - \frac{1}{\|H_{1 \times M_h^r}\|_F^2} \right\} -$$

$$\sum_{j=1, M_h^r \geq 2}^{M_h^r} E_j^r n_r N_s \underset{SISO}{\overset{V-SIMO}{\gtreqless}} 0$$

In this case, $\Psi_h$ is given by Equation 11.

$$\Psi_h = \frac{(4\pi)^2 (2^{k_h} - 1)\xi_h N_0 M_L N_f}{1.6 \, \eta G_t G_r \lambda^2} \ln\left(\frac{0.2}{\overline{P}_b}\right) \quad \text{[Equation 11]}$$

An average bit error rate (BER) $\overline{P}_b$ needed in a network, which is one important parameter that should be known to compare energy consumption, may be calculated by the following two methods.

First, if BER can be measured, a measured BER value is used. Second, if BER cannot be measured, a BER estimation equation of M-QAM transmission is indicated by the following Equation 12.

$$P_b \approx 0.2 \, e^{\frac{-1.6 \left\| H_{M_h^t \times M_h^r} \right\|_F^2 E_h^b}{(2^{k_h}-1)M_h^t N_0}} \quad \text{[Equation 12]}$$

Namely, the needed BER $\overline{P}_b$ can be estimated from a given $\overline{E}_h^b$ (energy per bit demanded in the network) and channel environment information $H_{M_h^t \times M_h^r}$.

According to the above calculation result, if a value of $\{E_h(1,1,d_h) - E_h(1, M_h^r, d_h)\}$ is less than 0, since energy efficiency of SISO is better, a transmission method of a corresponding interval is determined to be SISO and, if $\{E_h(1,1,d_h) - E_h(1, M_h^r, d_h)\}$ is greater than 0, the transmission method is determined to be V-SIMO.

(15) Elseif $(M_h^t, M_h^r) = (t, 1|t > 1)$ Then

When $(M_h^t, M_h^r) = (t, 1|t > 1)$, since the numbers of nodes which can be used for transmission in the receiver and the transmitter are one and plural, respectively, SISO transmission and V-MISO transmission may be considered. Then, to estimate a method having better energy efficiency, among SISO transmission and V-MISO transmission, optimal CN configuration is obtained by comparing energy consumption values of V-MISO transmission with respect to the number of optimal CNs, $M_h^t$, used for V-MISO transmission, starting from 1 to $\min(t, M_{opt})$. For example, the optimal CN may be configured.

$$M_h^t = \underset{M_h^t}{\operatorname{argmin}} \{E(M_h^t, 1, d_h): \forall M_h^t = 1, 2, \ldots, \min(t, M_{opt})\} \quad \text{[Equation 13]}$$

The source node may store the configured optimal CN.

(16) Compute $\{E_h(1, 1, d_h) - E_h(M_h^t, 1, d_h)\}$

To estimate a transmission method having higher energy efficiency, among SISO and V-MISO, the source node performs the following calculation.

$$\{E_h(1, 1, d_h) - E_h(M_h^t, 1, d_h)\} = \quad \text{[Equation 14]}$$

$$\Psi_h N_i d_h^\kappa \left\{ \frac{1}{\|H_{1\times 1}\|_F^2} - \frac{(M_h^t)^2}{\|H_{M_h^t \times 1}\|_F^2} \right\} +$$

$$\frac{N_i P_h^c (1 - M_h^t)}{k_h B} - \sum_{i=1, M_h^t \geq 2}^{M_h^t} N_i E_i^t \underset{SISO}{\overset{V-SIMO}{\gtreqless}} 0$$

According to the above calculation result, if a value of $\{E_h(1,1,d_h) - E_h(M_h^t, 1, d_h)\}$ is less than 0, since energy efficiency of SISO is better, a transmission method of a corresponding interval is determined to be SISO. If $\{E_h(1, 1,d_h) - E_h(M_h^t, 1, d_h)\}$ is greater than 0, the transmission method is determined to be V-MISO.

(17) Elseif $(M_h^t, M_h^r) = (t, r|t, r > 1)$ Then

If each of the numbers of nodes which can be transmitted by the receiver and the transmitter is plural and thus SISO, V-MISO, V-SIMO, and V-MIMO transmission may be considered, the source node may consider energy efficiency of the transmission method in the following order.

V-SIMO and SISO
V-SIMO and V-MIMO
V-SIMO and V-MISO

If the transmission distance is short, since SISO has high energy efficiency, SISO is selected as the transmission method. If the transmission distance is long, V-MIMO having high efficiency is selected. In the third step, a better method out of V-SIMO and V-MISO, which are similar in terms of energy efficiency, is selected.

First, to estimate V-SIMO transmission energy efficiency of □, $$M_h^r = \underset{M_h^r}{\operatorname{argmin}} \{E(1, M_h^r, d_h): \forall M_h^r = 1, 2, \ldots, \min(r, M_{opt})\}$$

is configured in the same way as in step (13) and the configured $M_h^r$ is stored.

(18) Compute $\{E_h(1, 1, d_h) - E_h(1, M_h^r, d_h)\}$

Step (18) is the same as step (14) in procedure. If the calculation result is less than 0, since energy efficiency of SISO is high, a transmission method of SISO is selected, and otherwise, a transmission method is determined according to the result of step (19).

(19) Compute $\{E_h(1, M_h^r, d_h) - E_h(M_h^*, M_h^*, d_h)\}$

As a result of comparing transmission energy of SISO with that of V-SIMO, if $\{E_h(1,1,d_h) - E_h(1, M_h^r, d_h)\}$ is greater than 0, the following calculation is performed in step (19). In this case, in order to obtain optimal V-MIMO transmission configuration, energy consumption values with respect to the number of transmission and reception CNs, $M_h^*$, starting from 1 to $M_{opt}$, are compared and $M_h^* \times M_h^*$ in which the optimal V-MIMO CN configuration satisfies $$M_h^* = \underset{M_h^*}{\operatorname{argmin}} \{E(M_h^*, M_h^*, d_h): \forall M_h^* = 1, 2, \ldots, \min(t, r, M_{opt})\}$$

is stored as an optimized configuration.

$$\{E_h(1, M_h^r, d_h) - E_h(M_h^*, M_h^*, d_h)\} = \quad \text{[Equation 15]}$$

$$\Psi_h N_i d_h^\kappa \left\{ \frac{1}{\|H_{1 \times M_h^r}\|_F^2} - \frac{(M_h^*)^2}{\|H_{M_h^* \times M_h^*}\|_F^2} \right\} + \frac{N_i P_h^c (1 - M_h^*)}{k_h B} +$$

-continued $$\sum_{j=1, M_h^r \geq 2}^{M_h^r} E_j^r n_r N_s - \sum_{i=1, M_h^* \geq 2}^{M_h^*} (E_i^r n_r N_s + N_i E_i^t) \underset{V-SISO}{\overset{V-SIMO}{\gtrless}} 0$$

According to the above calculation result, if a value of $\{E_h(1, M_h^r, d_h) - E_h(M_h^*, M_h^*, d_h)\}$ is greater than 0, since energy efficiency of V-MIMO is high, V-MIMO is determined as a transmission method of a corresponding interval. If $\{E_h(1, M_h^r, d_h) - E_h(M_h^*, d_h)\}$ is less than 0, the transmission method is determined in step (20).

(20) Compute $\{E_h(1, M_h^r, d_h) - E_h(M_h^*, 1, d_h)\}$

If the optimal transmission method determined through steps (18) and (19) is not V-MIMO and SISO, the transmission method is determined by comparing transmission efficiency of V-MISO with transmission efficiency of V-SIMO in step (20). In this case, to obtain the number of optimal CNs of V-MISO transmission, energy consumption values with respect to the number of optimal CNs, $M_h^t$, starting from 1 to $M_{opt}$ are compared to configure $$M_h^t = \underset{M_h^t}{\arg\min} \{E(M_h^t, 1, d_h) : \forall M_h^t = 1, 2, \ldots, \min(t, M_{opt})\}$$

and the configured $M_h^t$ is stored.

$$\{E_h(1, M_h^r, d_h) - E_h(M_h^t, 1, d_h)\} = \quad \text{[Equation 16]}$$

$$\Psi_h N_i d_h^\kappa \left\{ \frac{1}{\|H_{1 \times M_h^r}\|_F^2} - \frac{(M_h^t)^2}{\|H_{M_h^t \times 1}\|_F^2} \right\} + \frac{N_i P_h^c (1 - M_h^t)}{k_h B} +$$

$$\sum_{j=1, M_h^r \geq 2}^{M_h^r} E_j^r n_r N_s - \sum_{i=1, M_h^t \geq 2}^{M_h^t} N_i E_i^t \underset{V-SISO}{\overset{V-SIMO}{\gtrless}} 0$$

According to the above calculation, if $\{E_h(1, M_h^r, d_h) - E_h(M_h^t, 1, d_h)\}$ is greater than 0, since energy efficiency of V-MISO is high, a transmission method of a corresponding interval is determined to be V-MISO. If $\{E_h(1, M_h^r, d_h) - E_h(M_h^t, 1, d_h)\}$ is less than 0, since energy efficiency of V-SIMO is high, the transmission method of a corresponding interval is determined to be V-SIMO. If a transmission method in steps (12) to (20) is determined to be one of V-MIMO, V-MISO, V-SIMO, and SISO, a transmission method of a next hop is determined using the same method.

FIGS. 5, 6, 7, 8, and 9 illustrate message formats exchanged between nodes according to the message flows proposed in FIGS. 1 and 2. FIG. 5 is a view illustrating a CN REQ message. Through the CN REQ message of FIG. 5, the source node transmits an optimal M value, i.e. $M_{opt}$, calculated in an entire network and nodes in the network may form $M_{opt}$ based CNs. 2 bits having a value of 0, 1, 2, or 3 are allocated to an M field. The M field serves to inform neighboring nodes to use 0, 1, 2, or 3 V-MIMO CNs. In consideration of realistic restrictions of V-MIMO configuration, 2 bits are allocated to cover up to 3×3 V-MIMO transmission. When necessary, up to 3 bits may be allocated as a field value and 2-bit or 3-bit allocation is properly used for efficient transmission. Therefore, the message format in the present invention additionally includes the M field as opposed to a message format transmitted in a conventional routing protocol.

FIG. 6 is a view illustrating a CN information message. Nodes in a network broadcast the CN information message illustrated in FIG. 6 to neighboring nodes within one hop so that each node forms $M_{opt}$ or fewer CNs. Each node makes a CN list up to $M_{opt}$ CNs in order of nodes transmitting the CN information message having the strongest signal with reference to RSS of received CN information. Therefore, the message format in the present invention additionally includes the M field as opposed to a message format transmitted in a conventional routing protocol.

FIG. 7 is a view illustrating a CN REP message. The CN REP message of FIG. 7 has a message format for allowing each node to transmit location information thereof and CN information to the source node. The CN REP message includes an R field indicating whether a node is used as a routing path, a W field including information about participation willingness of a node, an E field for transmitting energy residual amount of a node classified into 8 steps to the source node, a location field for location information transmission, and a CN IP address field for transmitting information of a CN. That is, the E field includes a value indicating an energy residual amount index in each node so that nodes having high energy can participate in transmission. Through the CN REP message, path configuration can be performed using locations of nodes in a network and using node information. Accordingly, the message format in the present invention additionally includes the M field, W field, and E field as opposed to a message format transmitted in a conventional routing protocol.

FIG. 8 is a view illustrating an HV-MIMO setup message. The HV-MIMO setup message of FIG. 8 is a message for distributing a setup value for V-MIMO transmission calculated by the source node to each node. A C field for indicating information about the role of each node distinguishes roles of a transmission CN for V-MIMO transmission in an MECR, a reception CN for V-MIMO transmission, a reception node necessary for space-time block code (STBC) decoding of V-MIMO transmission, and the like. That is, the C field corresponds to a field for indicating role information of CNs. An HV-MIMO transmission ID address field is assigned an IP address value of a node that should be referred to for V-MIMO transmission. Accordingly, the message format in the present invention additionally includes the M field, C field, and HV-MIMO transmission IP address field as opposed to a message format transmitted in a conventional routing protocol.

FIG. 9 is a view illustrating a basic header format of a protocol. In FIG. 9, the header of the protocol includes a V field indicating a version of the protocol, an HV-MIMO type field for defining a transmission method such as SISO, V-MISO, V-SIMO, V-MIMO, etc. and the number of antennas (e.g. in the case of V-MISO transmission, 2×1, 3×1, 4×1, etc.) according to each transmission method, a feedback field for exchanging codebook information for effective beamforming in closed-loop MIMO transmission, a reserved field for later use, and a sequence number field for recording a sequence number. A receiver selects a proper beamforming vector among N codebook vectors known to both a transmitter and the receiver and transmits an index of the selected vector to the transmitter. Efficient feedback can be performed using $\log_2 N$ bits capable of processing a feedback bit. Although many codebooks have been developed, an example of a beamforming codebook designed based on Grassmannian line packing is as follows.

TABLE 1

Case where $M_h^t = 2$ and $N = 4$ (2 bits)

| | | | |
|---|---|---|---|
| −0.1612 − 0.7348 j | −0.0787 − 0.3192 j | −0.2399 + 0.5985 j | −0.9541 |
| −0.5135 − 0.4128 j | −0.2506 + 0.9106 j | −0.7641 − 0.0212 j | 0.2996 |

TABLE 2

Case where $M_h^t = 2$ and $N = 8$ (3 bits)

| | | | |
|---|---|---|---|
| 0.8393 − 0.2939 j | −0.3427 + 0.9161 j | −0.2065 + 0.3337 j | 0.3478 + 0.3351 j |
| −0.1677 + 0.4256 j | 0.0498 + 0.2019 j | 0.9166 + 0.0600 j | 0.2584 + 0.8366 j |
| 0.1049 + 0.6820 j | 0.0347 − 0.2716 j | −0.7457 + 0.1181 j | −0.7983 + 0.3232 j |
| 0.6537 + 0.3106 j | 0.0935 − 0.9572 j | −0.4553 − 0.4719 j | 0.5000 + 0.0906 j |

TABLE 3

Case where $M_h^t = 3$ and $N = 4$ (2 bits)

| | | | |
|---|---|---|---|
| $1/\sqrt{3}$ | $j/\sqrt{3}$ | $-1/\sqrt{3}$ | $-j/\sqrt{3}$ |
| $1/\sqrt{3}$ | $-1/\sqrt{3}$ | $1/\sqrt{3}$ | $-1/\sqrt{3}$ |
| $1/\sqrt{3}$ | $-j/\sqrt{3}$ | $-1/\sqrt{3}$ | $j/\sqrt{3}$ |

TABLE 4

Case where $M_h^t = 3$ and $N = 8$ (3 bits)

| | | | |
|---|---|---|---|
| $1/\sqrt{2}$ | $1/\sqrt{2}$ | 0 | $\frac{1}{\sqrt{2}}e^{2\pi j/3}$ |
| $1/\sqrt{2}$ | 0 | $1/\sqrt{2}$ | $\frac{1}{\sqrt{2}}e^{4\pi j/3}$ |
| 0 | $1/\sqrt{2}$ | $1/\sqrt{2}$ | 0 |
| $\frac{1}{\sqrt{2}}e^{2\pi j/3}$ | $\frac{1}{\sqrt{2}}e^{4\pi j/3}$ | $\frac{1}{\sqrt{2}}e^{4\pi j/3}$ | 0 |
| 0 | 0 | $\frac{1}{\sqrt{2}}e^{2\pi j/3}$ | $\frac{1}{\sqrt{2}}e^{4\pi j/3}$ |
| $\frac{1}{\sqrt{2}}e^{4\pi j/3}$ | $\frac{1}{\sqrt{2}}e^{2\pi j/3}$ | 0 | $\frac{1}{\sqrt{2}}e^{2\pi j/3}$ |

Figure 10:
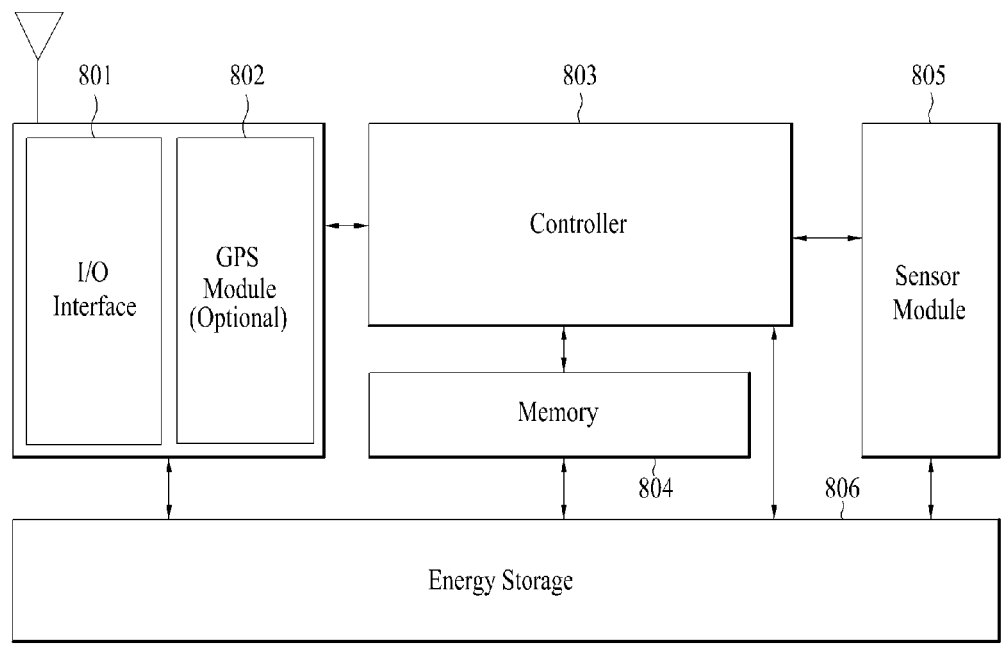
FIG. 10 is a view illustrating an HV-MIMO device for enabling information exchange for optimal V-MIMO transmission and enabling optimal path configuration.

FIG. 10 is a block diagram illustrating system implementation for design of an HV-MIMO device. The device, proposed in the present invention, for configuring an optimal multi-hop HV-MIMO transmission path and transmitting data through the path includes a radio communication module, a processor module including a memory, a sensor module, and an energy storage module (battery etc.).

The radio communication module includes an input/output (I/O) interface 801 for transmission with neighboring nodes and a GPS module 802. In this case, the GPS module is optionally configured to receive location and distance information of nodes. In the absence of the GPS module, an estimation method using RSS etc. is used as described above. The radio communication module transmits data designated by the processor module according to configuration of the processor module and transmits received data to the processor module.

The processor module includes a controller 803 and a memory 804. The controller has an STBC coding and decoding function for data transmission/reception of the radio communication module, a link-state based routing protocol function, and a function for performing an optimization algorithm as described in the pseudo code of FIG. 3. The controller processes information measured by the sensor module and transmits the processed information to the radio communication module. The controller stores a received packet or measured sensing information in the memory to raise processing efficiency. A sensor module 805 performs proper sensing according to sensor usage such as medicine, architecture, agriculture, environment, national defense, quarantine, distribution, etc. An energy storage module 806 such as a battery supplies power to the radio communication module, processor module, and the sensor module.

The processor module receives location and distance information of nodes when the GPS module is present in order to calculate the number of optimal CNs, $M_{opt}$. Nodes in a network perform radio communication with neighboring nodes through the I/O interface module. Therefore, broadcasting between nodes of the network or in a destination node, broadcasting in a source node, and broadcasting in a middle node may be performed through the I/O interface module.

The processor unit performs a routing protocol function of the present invention based on information about each node received from the radio communication module. That is, the processor module performs the above-described optimization algorithm in the pseudo code of FIG. 3 according to an embodiment of the present invention. The processing module of one node in a network, e.g. the processing node of the source node, calculates the number of optimal CNs, $M_{opt}$, and the radio communication module broadcasts a CN REQ message including the calculated $M_{opt}$ to all nodes in the network. Upon receiving the CN REQ message, all nodes transmit a CN information message including IO addresses or IDs of the nodes to neighboring nodes within on hop. For example, the source node S broadcasts the CN REQ message to the nodes n1 to n9 in the network as illustrated in FIG. 1. The nodes, which have received the CN REQ message from the source node, transmit the CN information message to neighboring nodes within a distance of one hop, for cooperation with a maximum of $M_{opt}$ nodes. That is, as illustrated in FIG. 1, the nodes n1 to n9 in the network, which have received the CN REQ message, transmit the CN information message to nodes within a distance of one hop. Upon receiving the CN information message, the nodes store node information, which is a list of up to $M_{opt}$ CNs among neighboring nodes within a distance of one hop in order of the strongest RSS of CN information and unicast a CN REP message including location information of the nodes and the CN information. Thus, upon receiving the CN REP message for HV-MIMO transmission from the processor module, the controller 803 of the source node processes information measured by the sensor module 805, stores the processed information in the energy storage module 806, and transmits the stored information to the radio communication module composed of an I/P interface 801 and the GPS module 802. Therefore, the radio communication module of the source node transmits a setup message regarding cooperative reception/transmission nodes configured by the controller of the source node to the radio communication module of a node forming a data transmission path. In each of all hops from the source node to the destination node, an optimal HV-MIMO transmission scheme is configured to transmit data.

Figure 11:
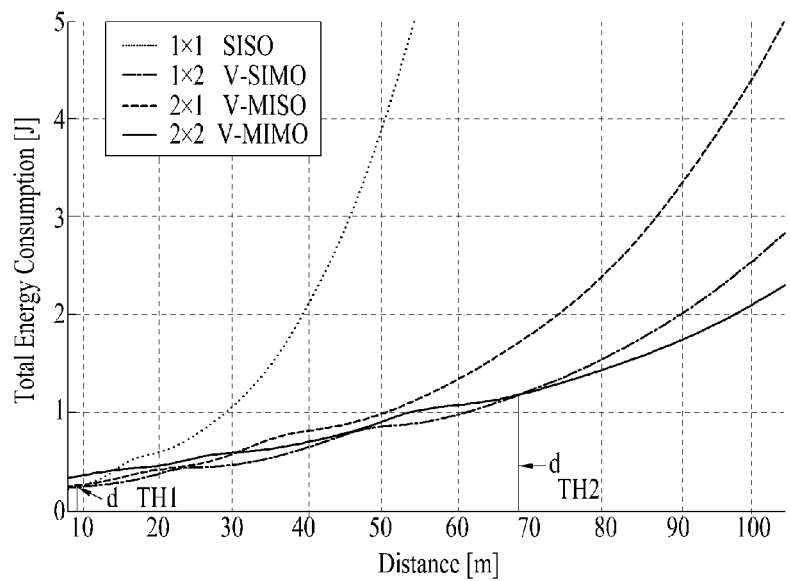
FIG. 11 is a graph illustrating energy efficiency according to a transmission distance and each transmission scheme of SISO, V-MISO, V-SIMO, and V-MIMO.

FIG. 11 is a graph illustrating energy efficiency according to a transmission scheme and transmission distance. Energy efficiency of SISO, V-MISO, V-SIMO, and V-MIMO varies with transmission distance. FIG. 11 illustrates an experimental result obtained by comparing one-hop transmission energy of each scheme of SISO, 2×1 V-MISO, 1×2 V-SIMO, and 2×2 V-MIMO when a data transmission rate between nodes is 10 kbps and a bit error rate (BER) between terminals is less than $10^{-3}$. It can be appreciated that V-MIMO transmission has the best energy efficiency in transmission in a long-haul fading environment, i.e. when a transmission distance is longer than $d_{TH2}$ (=68.63 m). If a transmission distance is shorter than $d_{TH1}$ (=9.22), SISO transmission has the best energy efficiency. If a transmission distance $d_h$ is longer than $d_{TH1}$ and is shorter than $d_{TH2}$, i.e. if $d_{TH1} < d_h < d_{TH2}$, V-MISO and V-SIMO transmission has the best transmission efficiency.

Figure 12:
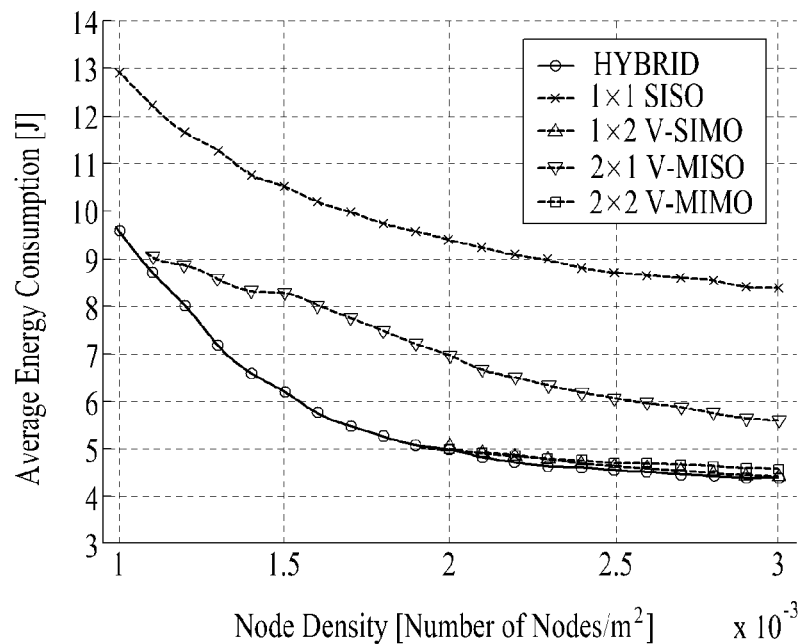
FIGS. 12, 13, and 14 are graphs illustrating energy consumption of SISO, V-MISO, V-SIMO, V-MIMO, and hybrid V-MIMO multi-hop transmission according to network environment.
Figure 13:
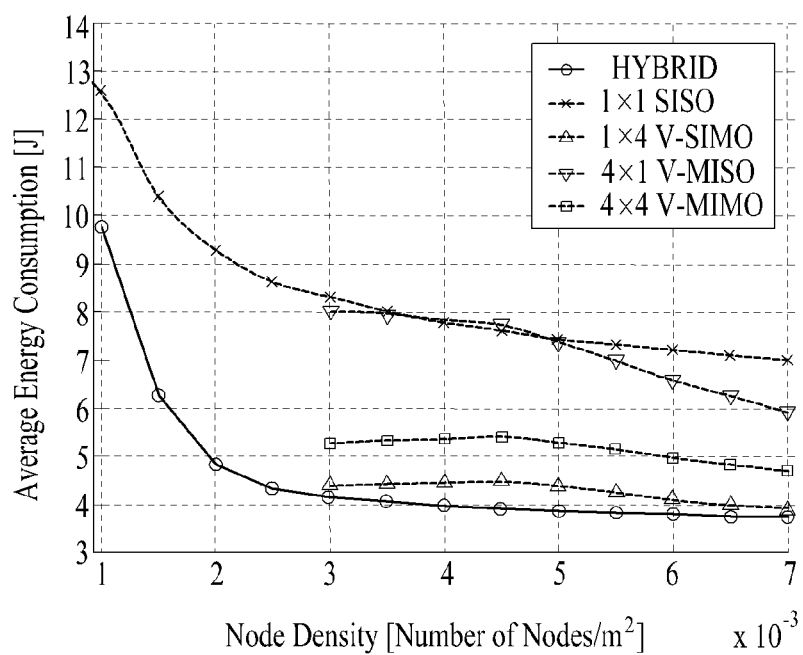
Figure 14:
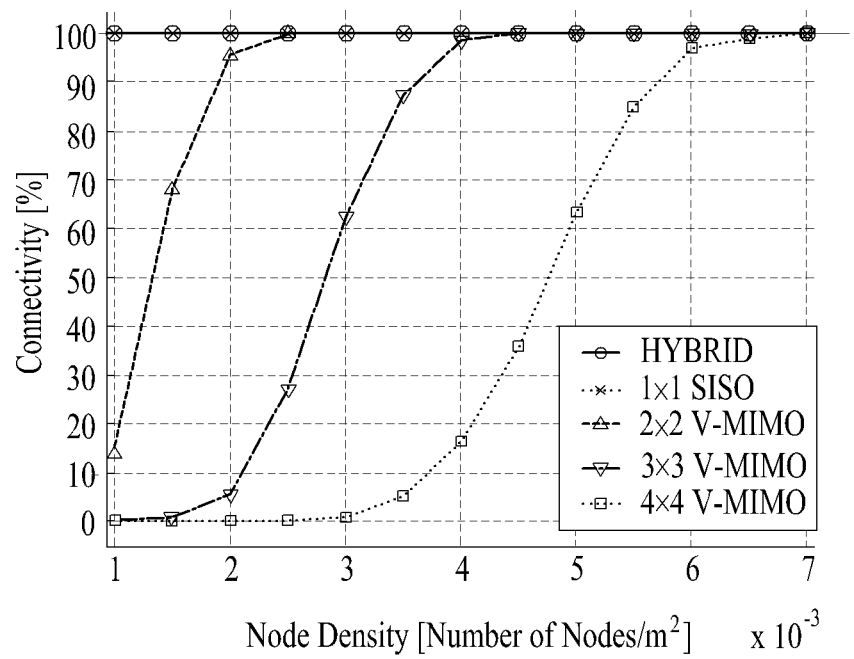

FIGS. 12, 13, and 14 are graphs illustrating energy consumption of each transmission scheme according a network environment. Energy consumption of SISO, V-MISO, V-SIMO, V-MIMO, and HV-MIMO multi-hop transmission differs according to node density.

FIGS. 12, 13, and 14 are graphs illustrating experimental results obtained by comparing energy consumption of each transmission scheme with connectivity according to variation in node density when a source node and a destination node are located at both ends in a space of 250×250 m², i.e. when a transmission distance is 250 m. Node density is defined as the average number of nodes per m² and nodes are randomly distributed according to uniform random distribution. A maximum transmission distance between the nodes is assumed to be 102.13 m with reference to IEEE 802.15.4-2006.

FIG. 12 shows comparison of energy consumption of SISO, 2×1 V-MISO, 1×2 V-SIMO, 2×2 V-MIMO, and hybrid transmission methods when the number of CNs of a protocol is restricted to 2 according to an embodiment of the present invention. In FIG. 13, when node density of a network is relatively high ($\rho$=0.003) the HV-MIMO transmission method has an average energy gain of 47.69% compared with SISO transmission and average energy gains of 1.10%, 21.85%, and 4.02% with respect to V-SIMO, V-MISO, and V-MIMO, respectively. When node density is $\rho$=0.002, HV-MIMO transmission has average energy gains of 47.19%, 2.08%, 28.65%, and 0.94% with respect to SISO, V-SIMO, V-MISO, and V-MIMO, respectively. When node density is relatively low, that is, when $\rho$=0.001, HV-MIMO transmission has an average energy gain of 25.69% compared with SISO. Thus, if the transmission distance is short, the SISO transmission scheme is selected and, if the transmission distance between hops is long, V-MIMO is selected, thereby achieving an HV-MIMO transmission method that minimizes energy consumption FIG. 13 shows comparison of energy consumption of SISO, 4×1 V-MISO, 1×4 V-SIMO, 4×4 V-MIMO, and hybrid transmission methods when the number of CNs of a protocol is restricted to 4 according to an embodiment of the present invention. In consideration of a relatively large number of CNs, an embodiment considering an environment having node density higher than in FIG. 12 is proposed. In FIG. 14, when node density of a network is relatively high ($\rho$=0.007), an HV-MIMO transmission method has average energy gains of 46.82% 3.57%, 37.04%, and 20.29% with respect to SISO, V-SIMO, V-MISO, and V-MIMO, respectively. When node density is $\rho$=0.004, HV-MIMO transmission has average energy gains of 48.89%, 10.59%, 49.34%, and 25.73% with respect to SISO, V-SIMO, V-MISO, and V-MIMO, respectively. When node density is $\rho$=0.001, HV-MIMO transmission has an average energy gain of 25.69% compared with SISO. V-SIMO, V-MISO, and V-MIMO transmission has difficulty in maintaining connectivity even in relatively high node density as the number of CNs increases.

FIG. 14 is an embodiment illustrating network connectivity according to node density. In FIG. 14, connectivity of SISO, 2×2 V-MIMO, 3×3 V-MIMO, 4×4 V-MIMO, and HV-MIMO is compared. MECR connectivity of HV-MIMO transmission reaches 99% when the node density is above $\rho$=0.00038 and shows high connectivity as in SISO which does not require an additional CN unlike V-MIMO transmission. 2×2 V-MIMO, 3×3 V-MIMO, and 4×4 V-MIMO reach connectivity of 99% in the case where density is $\rho$=0.0025 $\rho$=0.0045, $\rho$=0.0065 and, or more and maintain connectivity in an environment in which nodes are dense compared with HV-MIMO transmission.

FIG. 15 is a flowchart illustrating optimal V-MIMO transmission based on a middle node of a network according to another embodiment of the present invention. Each input/output combination ($M_h^t$, $M_h^r$) is used to calculate optimal transmission energy in each case where a parameter M=max ($M_h^t$, $M_h^r$) representative of the above combination is 1 to N. Here, $M_h^t$ is the number of transmitting output nodes and $M_h^r$ is the number of receiving input nodes. Therefore, the larger of the number of transmitting output nodes and the number of receiving input nodes in a network to which the above protocol is applied is determined to be $M_{opt}$.

In FIG. 15, a specific node of a network calculates the number of optimal CNs, $M_{opt}$, in the network (1501). The specific node of the network broadcasts a CN REQ message including the number of optimal CNs, $M_{opt}$, to all nodes of the network (1502). The specific node receives a CN REP message from nodes that can participate in data transmission in the network (1503). The specific node configures an optimal transmission path from a first node to a second node and cooperative transmission nodes and/or cooperative reception nodes in each hop of the optimal transmission path, based on the CN REP message (1504). The specific node transmits a CN setup message indicating information about the configured cooperative transmission nodes and/or cooperative reception nodes to corresponding nodes (1505).

In FIGS. 1, 2, and 15, the source node starts data transmission to a neighboring node of the source node according to the optimal transmission path determined by the source node, the destination node, or the middle node. The neighboring node transmits data to the next node along the optimal transmission path. In this way, each node constituting the optimal transmission path receives the data and transmits the data to the next node. In this case, cooperative transmission nodes configured in each hop participate in data transmission and cooperative reception nodes configured in each hop participate in data reception. That is, the data is transmitted from the source node to the destination node via nodes constituting the optimal transmission path and, in each hop of the optimal transmission path, the cooperative transmission nodes and/or cooperative reception nodes configured according to the present invention participate in data transmission/reception.

Figure 16:
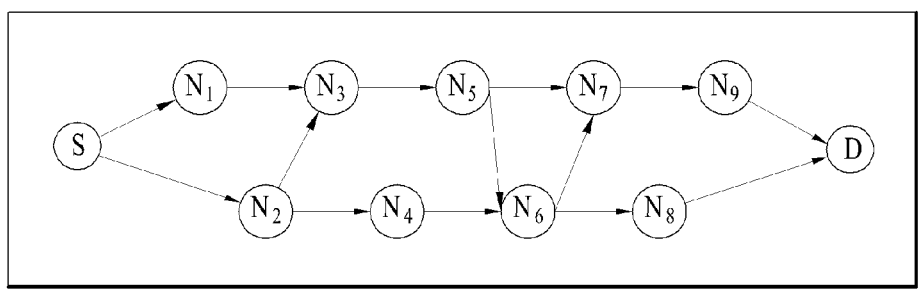
FIG. 16 is a view illustrating an exemplary transmission path configured in a network according to an embodiment of the present invention.

FIG. 16 is a view illustrating optimal transmission path configuration from a source node S to a destination node D.

For example, if the source node S configures the number of optimal CNs, $M_{opt}$, the source node S broadcasts a CN REQ message including the number of optimal CNs to nodes N1 to N9 of a network. Then, the nodes receiving the CN REQ message transmit a CN information message of neighboring nodes within a distance of one hop in order to configure CNs less than the number of optimal CNs, $M_{opt}$. Upon receiving the CN information message, the nodes store node information, which is a CN list up to $M_{opt}$ CNs in order of the strongest RSS of CN information among neighboring nodes within a distance of one hop and unicast a CN REP message including location information of the nodes and the CN information to the source node. Referring to FIG. 16, the nodes N1 to N9 transmit the CN REP message to the source node.

The source node transmits a CN setup message, which is information indicating cooperative transmission nodes and/or cooperative reception nodes for configuring the optimal transmission path in each hop, to corresponding nodes. That is, the cooperative transmission nodes and/or cooperative reception nodes in each node are determined by the CN setup message and an optimal HV MIMO transmission path may be configured. For example, from the viewpoint of node N3 of FIG. 16, if N3 is configured to receive data from N1 and N2 and transmit the data to N5, the number of cooperative transmission nodes, $M_h^t$ is 1 and the number of cooperative reception nodes, $M_h^r$, is 2. In this case, a MISO path configuration method is selected. In addition, if N6 is configured to receive data from N4 and N5 and transmit data to N7 and N8, $M_h^t$ is 2 and $M_h^r$ is 2. Then, a MIMO path configuration is selected. Namely, an optimal transmission path is configured by configuring a different path in each hop in the network. Therefore, the present invention provides a protocol for configuring an optimal HV-MIMO transmission path of a network in which the source node S transmits the CN setup message, which is information indicating and cooperative transmission nodes and/or cooperative reception nodes of each hop for an optimal transmission path, to corresponding nodes.

The invention claimed is:

1. A method for configuring a data transmission path from a first node to a second node at a predetermined node in an ad hoc network, the method comprising:
    calculating a number of optimal cooperative nodes in the network;
    transmitting a cooperative node request message including the number of the optimal cooperative nodes to each of nodes in the network;
    receiving a cooperative node reply message comprising information on at least one cooperative transmission node, from each of one or more of the nodes in the network, wherein a number of the at least one cooperative transmission node is up to the number of the optimal cooperative nodes;
    configuring an optimal transmission path from the first node to the second node and cooperative transmission nodes and cooperative reception nodes in each hop of the optimal transmission path, based on the cooperative node reply message; and
    transmitting a cooperative node setup message indicating information on the cooperative transmission nodes and the cooperative reception nodes for optimal transmission path configuration to associated nodes,
    wherein the number of the optimal cooperative nodes is calculated based on energy of each of the nodes in the network, and
    wherein the energy of each of the nodes in the network is calculated based on at least effective node density ($\rho_{M \times M}$) determined based on an equation 1 below, per a combination of a number of transmission output nodes of each of the nodes in the network and a number of reception input nodes of each of the nodes in the network, $$\rho_{M \times M} = \frac{\rho e^{-\pi(d_{local})^2 \rho} \{\pi(d_{local})^2 \rho\}^M}{M!}, \quad [\text{equation 1}]$$

wherein $\rho$ is a node density acquired from network initial establishment, $d_{local}$ denotes a maximum value of a distance between nodes forming a virtual input or a virtual output, and M is a parameter representative of a combination of each input node and output node according to equation 2 below, $$M = \max(M_h^t, M_h^r), \quad [\text{equation 2}]$$

wherein $M_h^t$ is a number of transmission output nodes of each of the nodes in the network, and $M_h^r$ is a number of reception input nodes each of the nodes in the network.

2. The method according to claim 1, wherein the number of the optimal cooperative nodes is calculated by the first node, or the second node, or a middle node having higher power in the network.

3. The method according to claim 1, wherein each of a number of the cooperative transmission nodes and a number of the cooperative reception nodes configured in each hop is less than the number of the optimal cooperative nodes.

4. The method according to claim 1, wherein the cooperative node reply message further includes location information of cooperative nodes.

5. The method according to claim 1, wherein the cooperative node reply message includes information on cooperative transmission nodes or cooperative reception nodes preferred by the nodes transmitting the cooperative node reply message and the preferred cooperative transmission nodes and the preferred cooperative reception nodes are determined based on received signal strength (RSS).

6. The method according to claim 1, wherein the cooperative node reply message further includes information on residual energy of the cooperative transmission nodes and the cooperative reception nodes in the network.

7. The method according to claim 1, wherein the optimal transmission path is configured using any one of virtual single input multiple output (V-SIMO), single input single output (SISO), virtual multiple input multiple output (V-MIMO), virtual multiple input single output (V-MISO) schemes.

8. An apparatus for configuring a data transmission path from a first node to a second node at a predetermined node in an ad hoc network, the apparatus comprising:
    a radio communication module configured to transmit and receive signals; and
    a processor module operably coupled to the radio communication module,
    wherein the processor module is configured to:
    calculate a number of optimal cooperative nodes in the in the network,
    control the radio communication module to transmit a cooperative node request message including the number of the optimal cooperative nodes to each of nodes in the network, control the radio communication module to receive a cooperative node reply message comprising information on at least one cooperative transmission node, from each of one or more of the nodes in the network, wherein a number of the at least one cooperative transmission node is up to the number of the optimal cooperative nodes, configure an optimal transmission path from the first node to the second node and cooperative transmission nodes and cooperative reception nodes in each hop of the optimal transmission path, based on a cooperative node reply message received from one or more nodes in the network, and control the radio communication module to transmit a cooperative node setup message indicating information on the configured cooperative transmission nodes and cooperative reception nodes to associated nodes, wherein the number of the optimal cooperative nodes is calculated based on energy of each of the nodes in the network, and wherein the energy of each of the nodes in the network is calculated based on at least effective node density ($\rho_{M \times M}$) determined based on an equation 1 below, per a combination of a number of transmission output nodes of each of the nodes in the network and a number of reception input nodes of each of the nodes in the network, $$\rho_{M \times M} = \frac{\rho e^{-\pi(d_{local})^2 \rho} \{\pi(d_{local})^2 \rho\}^M}{M!},\qquad \text{[equation 1]}$$

wherein $\rho$ is a node density acquired from network initial establishment, $d_{local}$ denotes a maximum value of a distance between nodes forming a virtual input or a virtual output, and M is a parameter representative of a combination of each input node and output node according to equation 2 below, $$M = \max(M_h^t, M_h^r),\qquad \text{[equation 2]}$$

wherein $M_h^t$ is a number of transmission output nodes of each of the nodes in the network and $M_h^r$ is a number of reception input nodes of each of the nodes in the network.

9. The apparatus according to claim 8, wherein the processor module is located at the first node, the second node, or a middle node having high power in the network.

10. The apparatus according to claim 8, wherein each of a number of the cooperative transmission nodes and a number of the cooperative reception nodes configured in each hop is less than the number of the optimal cooperative nodes.

11. The apparatus according to claim 8, wherein the cooperative node reply message further includes location information of cooperative nodes.

12. The apparatus according to claim 8, wherein the cooperative node reply message includes information on cooperative transmission nodes or cooperative reception nodes preferred by one or more nodes in the network.

* * * * *